United States Patent [19]

Luepertz

[11] 4,189,190
[45] Feb. 19, 1980

[54] BRAKE SYSTEM FOR MOTORCYCLES
[75] Inventor: Hans-Henning Luepertz, Darmstadt, Fed. Rep. of Germany
[73] Assignee: ITT Industries, Incorporated, New York, N.Y.
[21] Appl. No.: 916,630
[22] Filed: Jun. 19, 1978
[30] Foreign Application Priority Data
Jul. 11, 1977 [DE] Fed. Rep. of Germany ....... 2731201
[51] Int. Cl.² .............................................. B60T 8/26
[52] U.S. Cl. .................................... 303/6 C; 188/344
[58] Field of Search ....................... 188/344, 345, 349; 303/6 R, 6 C, 22 R, 24 F

[56] References Cited
U.S. PATENT DOCUMENTS

| 3,899,055 | 8/1975 | Shreve | 188/344 |
|---|---|---|---|
| 3,976,334 | 8/1976 | Farr | 303/6 C |
| 3,993,174 | 11/1976 | Williams et al. | 188/344 |

Primary Examiner—Duane A. Reger
Attorney, Agent, or Firm—John T. O'Halloran; Alfred C. Hill

[57] ABSTRACT

There is disclosed a reducer unit for a motorcycle brake system including a hand master cylinder actuatable by hand force and a pedal master cylinder actuatable by force applied to the pedal. The reducer, which is connected to both master cylinders, ensures at all times optimum brake force distribution, in spite of different actuating forces. In this arrangement, the valve closure member controlling the connection between the pedal master cylinder and the rear-wheel brake is influenced by the pedal master cylinder pressure such that it is allowed to assume its closing position only when pressure is built up by the pedal master cylinder. Vacuum otherwise occurring in the rear-wheel brake is thus effectively avoided.

6 Claims, 1 Drawing Figure

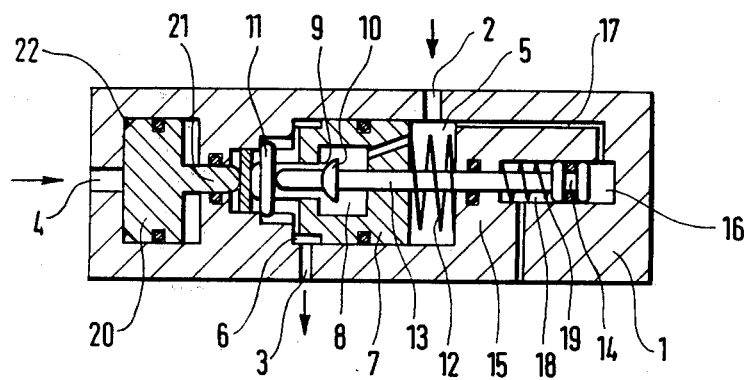

BRAKE SYSTEM FOR MOTORCYCLES

BACKGROUND OF THE INVENTION

This invention relates to a brake system for motorcycles having a hand master cylinder connected to a front-wheel brake and a pedal master cylinder connected to at least one rear-wheel brake through a reducer unit controllable by the pressure from the hand master cylinder.

Motorcycle operators who are used to conventional brake systems often brake initially only with the hand brake which acts on the front-wheel brake. In a known brake system, excessive actuation of the hand brake may cause displacement of the piston arrangement of the reducer unit and, as a result, closing of the valve closure member occurs. If the foot brake is applied thereafter, the piston arrangement of the reducer unit must be first displaced back into its normal position to enable the valve closure member to open to permit pressure fluid to be supplied to the rear-wheel brake.

SUMMARY OF THE INVENTION

It is an object of the present invention to improve the known brake system so that the valve closure member of the reducer unit moves into the closing position only when pressure is being built up by means of the pedal master cylinder.

A feature of the present invention is the provision of a brake system for motorcycles having a hand master cylinder connected to a front-wheel brake and a pedal master cylinder connected to at least one rear-wheel brake through a reducer unit controllable by the pressure from the hand master cylinder, the reducer unit comprising: a housing having a longitudinal axis; a piston disposed within and slidably sealed to an inner surface of a bore of the housing, the piston having one side providing a boundary for an inlet chamber communicating with the pedal master cylinder and the other side providing a boundary for an outlet chamber communicating with the rear-wheel brake; a passageway disposed within the piston coaxial of the axis; a valve closure member disposed within the passageway coaxial of the axis to close the passageway, the valve closure member being preloaded in the open position and subject to pressure from the pedal master cylinder in the closing direction; a secondary piston disposed within the housing coaxial of the axis and spaced from the piston, the secondary piston being subjected to pressure from the hand master cylinder in a direction toward the piston; and a rod connected to the secondary piston coaxial of the axis, the rod bearing on the piston.

The above arrangement has the advantage of providing at all times a connection between the pedal master cylinder and the rear-wheel brake when the pedal master cylinder is not activated, irrespective of the position of the piston. This arrangement precludes pressure fluid being drawn from the rear-wheel brake when the hand master cylinder alone is activated to cause the piston to move.

In a particularly advantageous embodiment, the piston is stepped in the outlet chamber and penetrated by a cross member adapted to bear on a step in the outlet chamber, with the valve closure member being in turn adapted to bear upon the cross member in such a manner as to be urged into the open position when the piston moves in the direction towards the outlet chamber. This arrangement affords ease of manufacture and assembly of the individual components.

It is also an advantage to provide the valve closure member with an extension which extends through the inlet chamber, projects into a cylindrical chamber and is connected with a valve piston, and to provide for connection between the pedal master cylinder and the cylindrical chamber remote from the valve closure member and bounded by the valve piston, while the opposite chamber communicates with atmosphere. This arrangement obviates the need for a device in the piston urging the valve closure member into the closing direction in response to the pedal master cylinder pressure, which would require a connection leading out of the piston.

Because of the arrangement of a spring in the chamber communicating with atmosphere, which spring biases the valve closure member in the opening direction and bears upon the housing on the one end and on the valve piston on the other end, the piston design may be relatively small since the spring is accommodated by a chamber which is available anyway.

Because the piston is biased in the direction towards the outlet chamber by a spring held in the inlet chamber between the piston and the housing, all parts of the reducer unit are always in their normal positions at the beginning of a braking operation and need not be displaced suitably by applying pressure to them.

BRIEF DESCRIPTION OF THE DRAWING

The above-mentioned and other features and objects of the present invention and the manner of obtaining them will become more apparent by reference to the following description taken in conjunction with the drawing, the single FIGURE of which is a longitudinal cross-sectional view of a reducer unit in accordance with the principles of the present invention.

DESCRIPTION OF THE PREFERRED EMBODIMENT

In the FIGURE of the drawing, reference numeral 1 designates a reducer unit having its pressure-fluid port 2 connected to a pedal master cylinder not shown and its pressure fluid port 3 connected to a rear-wheel brake not shown. Through a pressure-fluid port 4, the reducer unit is in communication with a hand master cylinder not shown. Pressure-fluid port 2 opens into an inlet chamber 5, while pressure-fluid port 3 opens into an outlet chamber 6. A slidably sealed piston 7 separates inlet chamber 5 from outlet chamber 6, piston 7 having, however, a passageway 8 which is adapted to be closed at a valve seat 9 by a valve closure member 10. On its end facing the outlet chamber 6, piston 7 is of stepped design and penetrated by a cross member 11 adapted to bear upon a step in the housing and to move axially relative to the piston 7. The valve closure member 10 bears upon the cross member 11 in such a manner that member 10 will be lifted off its valve seat 9 when the piston 7 moves towards the outlet chamber 6. The inlet chamber 5 accommodates a spring 12 bearing with one end on the piston 7 and with its other end on the housing. The valve closure member 10 has an extension 13 extending out of the piston 7 through the inlet chamber 5 and a separating wall 15 into a coaxial bore in which the extension 13 is connected with a sealingly slidable valve piston 14. On its end remote from the valve closure member 10, the valve piston 14 forms a boundary for a cylindrical chamber 16 which communicates with the inlet chamber 5 through a channel 17. A chamber 18 lying on the opposite side of valve piston 14 communicates with atmosphere. Chamber 18 accommodates a spring 19 bearing upon the valve piston 14 on the one end and on the housing on the other end.

Coaxially with the piston 7 is a secondary piston 20 which bears on the piston 7 via a rod 21 sealingly movable into the outlet chamber 6. The end of the secondary piston 20 remote from the piston 7 forms a boundary for a chamber 22 into which the pressure-fluid port 4 opens.

The mode of operation of the brake system constructed in accordance with the principles of this invention is the following:

If only the pedal master cylinder is activated initially, pressure fluid will be supplied to the inlet chamber 5 which flows through passageway 8 to outlet chamber 6 and hence to the rear-wheel brake. After the clearance of the rear-wheel brake has been overcome, pressure will build up and act on either end of the piston 7 so that it will remain in that position. The same pressure is also supplied to the cylindrical chamber 16 where it acts upon the valve piston 14 whereby the valve closure member 10 is urged into the closing direction. The valve closure member 10 is, however, not allowed to become seated on valve seat 9 because it is supported on the housing via the cross member 11. If the hand master cylinder is activated additionally, pressure will build up in chamber 22 and urge the secondary piston 20 to the right, thereby displacing the piston 7 through the rod 21 correspondingly. As a result, the valve closure member 10 becomes seated on the valve seat 9 so that, with the displacement movement to the right continuing, the pressure in outlet chamber 6 will be reduced relative to the pressure in inlet chamber 5. The effect thereby achieved is that the pressure in outlet chamber 6 becomes reduced the more the hand master cylinder is activated.

If only the hand cylinder is activated initially at the beginning of a braking operation, pressure will build up in the chamber 22 and the secondary piston 20 and the piston 7 will be displaced to the right. The spring 18 keeps the valve closure member 10 spaced apart from the valve seat 9. As the piston 7 moves to the right, the pressure fluid urged out of the inlet chamber 5 will flow through the passageway 8 into the expanding outlet chamber 6. Thus, no pressure fluid will be drawn from the rear-wheel brake which would result in an increased clearance of this brake.

If the pedal cylinder is activated additionally, pressure fluid will again flow from the inlet chamber 5 through the passageway 9 to the outlet chamber 6 and hence to the rear-wheel brake until the clearance of this brake is overcome. The spring 18 prevents the low pressure required for overcoming the clearance of the rear-wheel brake displacing the valve closure member 10 by means of the piston 14. However, during the pressure build-up that follows, the valve closure member 10 will become seated on the valve seat 9 as a result of the pressure acting on the valve piston 14. When the pedal master cylinder continues to be activated, a state of equilibrium is again established between the pressure of the pedal master cylinder, the pressure supplied to the rear-wheel brake, and the pressure of the hand master cylinder. In this arrangement, the state of equilibrium established is completely independent of which brake-actuating arrangement was activated first.

While I have described above the principles of my invention in connection with specific apparatus it is to be clearly understood that this description is made only by way of example and not as a limitation to the scope of my invention as set forth in the objects thereof and in the accompanying claims.

I claim:

1. A brake system for motorcycles having a hand master cylinder connected to a front-wheel brake and a pedal master cylinder connected to at least one rear-wheel brake through a reducer unit controllable by the pressure from said hand master cylinder, said reducer unit comprising:

a housing having a longitudinal axis;

a first piston disposed within and slidably sealed to an inner surface of a bore of said housing, said first piston having one side providing a boundary for an inlet chamber communicating with said pedal master cylinder and the other side providing a boundary for an outlet chamber communicating with said rear-wheel brake;

a passageway disposed within said first piston coaxial of said axis;

a valve closure member disposed within said passageway coaxial of said axis to close said passageway, said valve closure member being preloaded in the open position and subject to pressure from said pedal master cylinder in the closing direction;

a second piston disposed within said housing coaxial of said axis and spaced from said first piston, said second piston being subjected to pressure from said hand master cylinder in a direction toward said first piston; and a rod connected to said second piston coaxial of said axis, said road bearing on said first piston.

2. A brake system according to claim 1, wherein said first piston has a step in said outlet chamber, and said bore has a step in said outlet chamber; and further including a cross member penetrating said step of said first piston and adapted to bear against said step of said bore;

said valve closure member being adapted to bear against said cross member in such a manner as to be urged into an open position when said first piston moves in a direction toward said outlet chamber.

3. A brake system according to claims 1 or 2, further including a cylindrical chamber disposed within said housing coaxial of said axis spaced from said inlet chamber;

a valve piston disposed within said cylindrical chamber coaxial of said axis, said valve piston dividing said cylindrical chamber into a first chamber remote from said inlet chamber and a second chamber adjacent said inlet chamber, said first chamber being in communication with said inlet chamber and said second chamber being in communication with atmosphere; and an extension secured to said valve closure member and said valve piston extending coaxially of said axis through said inlet chamber and said second chamber.

4. A brake system according to claim 3, further including a first spring disposed in said second chamber surrounding said extension, said first spring having one end bearing on said housing and the other end bearing on said valve piston, said first spring biasing said valve closure member in an opening direction.

5. A brake system according to claim 4, further including
 a second spring disposed in said inlet chamber coaxial of said axis between said first piston and said housing biasing said first piston in a direction toward said outlet chamber.

6. A brake system according to claim 1, further including
 a spring disposed in said inlet chamber coaxial of said axis between said first piston and said housing biasing said first piston in a direction toward said outlet chamber.

* * * * *